United States Patent Office 2,772,950
Patented Dec. 4, 1956

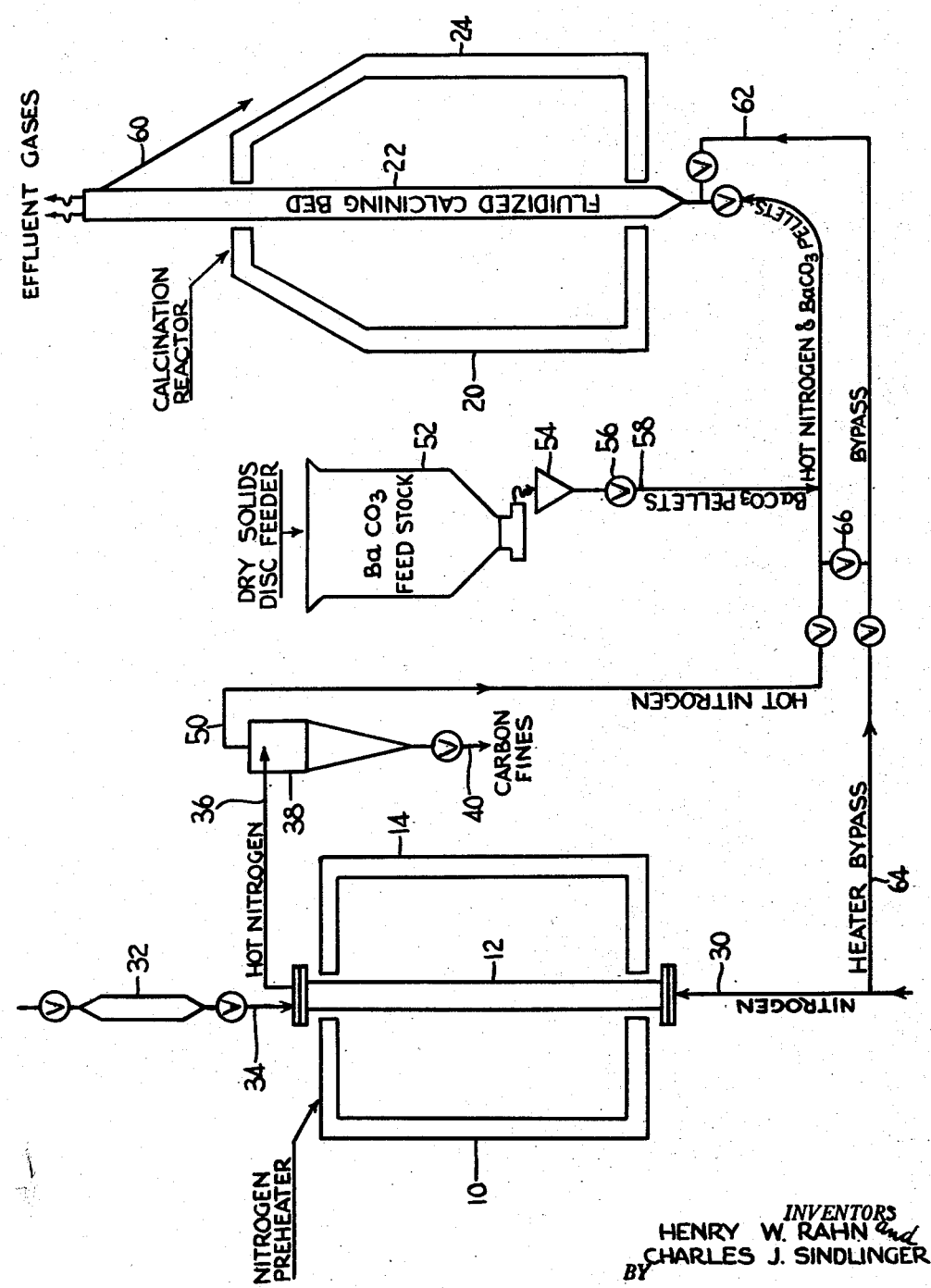

2,772,950
CALCINATION OF BARIUM CARBONATE

Henry W. Rahn and Charles J. Sindlinger, Corpus Christi, Tex., assignors to Columbia-Southern Chemical Corporation Application April 1, 1952, Serial No. 279,786

9 Claims. (Cl. 23—186)

This invention is directed to a novel method of calcining barium carbonate to barium oxide. While calcination of barium carbonate has been investigated by prior workers and batch processes actually used in commercial operation, no satisfactory process for continuous calcination appears to have been worked out prior to this invention. Since the reaction is endothermic, heat must be supplied. However, direct fired methods commonly applied to calcium carbonate are not suitable since the reaction mixture either fuses in the kiln during calcination or is very incompletely calcined.

Barium carbonate may be calcined by heating at a temperature above 1360° C. However, such serious fusion occurs that the process is hardly practical. On the other hand, where carbon is present and the reaction is conducted in a stream of inert gas, such as nitrogen, the reaction proceeds at a much lower level, usually ranging between 800 to 1100° C. This is particularly advantageous because the reaction must be conducted using an indirect method of heating since it simplifies the problem of obtaining metals or other heat-conductive materials of construction which will withstand the chemical and mechanical attack inherent in the process.

It is also desirable to prevent appreciable concentrations of water, carbon dioxide, and oxygen from entering the calcination zone. Oxygen is objectionable since it tends to react with the carbon, forming carbon dioxide. This not only uses up carbon which would otherwise be available for the reduction but, also, tends to reverse the reaction and make it more difficult to cause the reaction to proceed to substantial completion. Carbon dioxide, of course, has a like objection. Water is objectionable since it tends to cause barium hydrate which promotes fusion.

Where it is intended to produce barium peroxide from the resulting barium oxide, the amount of carbon which may be used should not be excessive. The theoretical amount of carbon required to react with the barium carbonate to produce barium oxide and carbon monoxide is about 6 percent by weight of the barium carbonate. Where the carbon concentration exceeds more than about 6 percent, there exists a tendency for the carbon to remain in the barium oxide product produced. When this product is heated in air or oxygen in order to produce barium peroxide, the residual carbon reacts to form carbon dioxide with consequent production of barium carbonate. Such reaction, of course, tends to defeat the purpose of the process. On the other hand, it is usually impossible to operate with exactly the stoichiometric amount of carbon. Consequently, an amount of carbon of about 6 to 8 percent, based upon the barium carbonate in the composition, normally is used.

It should be understood that higher concentrations of carbon may be used where the barium oxide is to be used for purposes other than the production of barium peroxide. Moreover, even where the barium oxide is to be used for barium peroxide, such higher carbon concentrations may be used, provided a suitable method is resorted to in order to remove some or all of the carbon. For example, a mixture of barium oxide and carbon may be heated at an elevated temperature, for example, from 800 to 1100° C. while passing a mixture of nitrogen or like inert gas and oxygen, which mixture contains less than 20 percent by volume of oxygen. Such a process may be used to materially reduce the carbon concentration of the barium carbonate without excessive formation of barium carbonate. The barium oxide thus treated may be subjected to peroxidation without difficulty. Furthermore, barium oxide may be produced for other purposes using higher concentrations of carbon, for example, up to 20 percent or more of the weight of the barium carbonate. Such larger concentrations tend to reduce or minimize fusion problems.

Even when a mixture of barium carbonate and carbon is calcined in a stream of inert gas, such as nitrogen, fusion occurs to such a degree that calcination in a continuous manner, in which barium carbonate is continuously fed and barium oxide continuously withdrawn, becomes extremely difficult. This is especially true where the carbon content is as little as 8 percent by weight.

It has now been found that this tendency toward fusion may be materially reduced by maintaining a high concentration of barium oxide preferably in excess of the barium oxide content of the barium oxide-barium carbonate eutectic in the bed undergoing calcination. This may be accomplished, for example, by establishing a bed heated to calcination temperature and containing at least 50 to 75 percent, and preferably in excess of 90 percent, by weight of barium oxide, and adding barium carbonate thereto while withdrawing barium oxide, the rates of addition and withdrawal being such that the BaO content of the bed does not fall below 50 percent for an appreciable period, and preferably remains above 90 percent by weight during the calcination. Alternatively, barium oxide may be mixed with barium carbonate in amounts equal to 50 percent or more of the barium carbonate-barium oxide content of the mixture, and the mixture introduced into the calcination zone. By recourse to this procedure, the fusion or sintering encountered in prior processes is avoided or minimized to a degree sufficient to permit flow of the material through a calcination zone and, thus, the process may be conducted in a continuous or semi-continuous manner. A typical embodiment of a method of practicing this invention is illustrated diagrammatically in the accompanying drawing.

The calcination of barium carbonate may be most conveniently effected by establishing a fluid bed of barium oxide, or mixture of barium oxide and barium carbonate, in an upwardly rising stream of inert or non-reactive gas. Such a bed is quite dense, is highly turbulent, and has many of the fluid characteristics of a boiling liquid, usually having a well-defined upper surface. When this bed has been established, it is heated to calcination temperature and barium carbonate is fed to the fluid bed, calcined barium oxide being withdrawn from the bed continuously or from time to time.

In order to avoid excessive production of dust and to insure establishment of a fluid bed, it is desired to calcine granules of barium carbonate which are of substantial size. Thus it has been found that barium carbonate which has a particle size smaller than about 80 mesh does not readily form a fluidized bed. Consequently, the greater portion of the barium carbonate to be treated should be of a particle size greater than 80 mesh. The maximum particle size depends to some degree upon the gas velocity. In general, it is preferred to make use of a bed having an average particle size ranging from minus 10 to plus 80 mesh.

In general, it is undesirable to calcine raw barium carbonate of the above particle size. Consequently, the barium carbonate itself should be of a relatively fine particle size, usually being well below 100 mesh. This barium carbonate is then made up into pellets or particles by mixing the barium carbonate, carbon black, and a suitable carbonaceous binder. Such binder must be capable of decomposing to evolve carbon or a gas, such as carbon dioxide, at the temperature of operation. Typical binders are starch paste, such as pastes formed from wheat starch and other grain starches, including corn starch, rice starch, and various other gluten-contain materials, glue, sugars, syrups, molasses, and the like, and various other carbonaceous binders of analogous character, particularly those compatible with water. The amount of binder which is used is not large and, thus, does not appreciably affect the required carbon content of the barium carbonate-carbon mixture. Usually, water is used in conjunction with the binder.

In the production of these granules or pellets, carbon, barium carbonate, and the binder are mixed with water in a suitable manner, for example, in a pug mill, to produce a plastic formable mass, and the product is extruded or otherwise formed into rods or like shape, usually having a diameter of 1/8 to 1/4 inches. These rods are dried at a low temperature, for example, 100 to 150° C., in order to remove a major portion of the water therefrom. After the drying operation, the extruded rods are found to lose less than 0.1% by weight of moisture when heated at 100° C. over a period of 24 hours. This amount is not objectionable. However larger amounts tend to cause scaling or fusion in the calcination zone. Thereafter, the granules are lightly crushed and screened in order to obtain particles of the size specified above.

In the practice of the calcination, a tubular reactor adapted to hold a fluidized bed is provided. An upwardly flowing stream of inert gas, such as nitrogen, is introduced into the lower portion of the tube, and a body of previously calcined barium oxide granules is introduced into the reactor to establish a dense fluidized bed thereof. Such a bed has a well defined upper level and is characterized by its high turbulence and its resemblance to boiling liquid.

The fluidized bed having been established, it is heated to calcination temperature and barium carbonate granules introduced. Thereafter, the barium carbonate granules are fed and barium oxide granules withdrawn continuously or intermittently. The composition of the bed remains high in barium oxide, at least 50 percent and usually running over 90 percent by weight of BaO, and, thus, fusion is minimized by the high BaO content of the bed.

The temperature of operation of the calcination reactor generally is established between 800 and 1000° C. While higher temperatures are operative, the problem of obtaining walls of suitable metal, which will stand up during operation and will conduct heat through to the reaction, becomes more complex. Furthermore, fusion becomes more serious. Using refractory materials of constructions which are especially adapted to stand the required temperature, temperatures as high as 1200° C., or even higher, can be resorted to. However, the problem of supplying heat to the calcination through a refractory wall is difficult. Heat is supplied by heating the reactor through its walls and/or by pre-heating the fluidizing gas.

Where the barium oxide is used in a cyclic process as, for example, in the production of barium peroxide and subsequent production of hydrogen peroxide, it is found desirable to use a relatively pure grade of carbon in the granules. Thus, where the carbon is relatively impure, the impurities tend to remain in the barium carbonate. The resulting barium oxide, of course, is used to produce hydrogen peroxide as above discussed and, in consequence, the barium carbonate ultimately formed tends to contain the impurities which have been incorporated or added to the carbon. As the barium carbonate is recycled through a plurality of cycles, such impurities build up to objectionable concentrations. Consequently, a relatively pure form of carbon is found to be advantageous. Lampblack and various gas blacks are suitable for this purpose. Moreover, petroleum coke may be used, provided the amount of impurities is not excessive.

The resulting product produced by the above described fluidizing process is largely in the form of hard granules which are unusually well bonded apparently due to slight local fusion and contains small amounts of barium carbonate (less than 19 percent and usually 1 to 5 percent by weight of the BaO and BaCO₃ in the calcined product), depending upon the degree of calcination, together with some barium peroxide, which may form when the barium oxide is allowed to cool in air. The product also may contain some carbon. Usually, where the product is used to produce barium peroxide, the amount of carbon present is held to a minimum, as has been previously explained.

From time to time, difficulty is encountered due to deposition of a scale or deposit upon the walls of the calcination reactor. This frequently is due to the presence of oxygen, carbon dioxide, or water in the incoming nitrogen or moisture in the granules. In general, the nitrogen should not contain in excess of 1/2 percent each of oxygen and carbon dioxide and, preferably, the nitrogen should contain less than 0.1–0.2 percent of either of these components. The removal of these components offers certain problems. In theory, oxygen can be removed by incorporation of hydrogen into the gas and passing the resulting nitrogen over a hot catalyst. On the other hand, this results in the production of water which is equally objectionable in the reaction.

Since carbon monoxide is evolved in the reaction, it might be expected that the presence of carbon monoxide would be objectionable because of a tendency to reverse the reaction. It has been found, however, that if the oxygen and carbon dioxide in the nitrogen is reacted with carbon or hydrocarbon gas, in amounts sufficient to produce carbon monoxide, this amount of evolved carbon monoxide does not adversely affect the reaction provided the initial oxygen and carbon dioxide contents are below 1 or 2%. Consequently, it is generally advantageous to heat the nitrogen in the presence of carbon or hydrocarbon gas, such as methane, prior to introducing the nitrogen into the reactor. Other methods of purification also may be used.

The apparatus diagrammatically illustrated in Fig. 1 may be used in performance of the fluidized calcination herein contemplated. This apparatus comprises a nitrogen pre-heater 10 which is connected to the fluidizing calciner 20. The nitrogen pre-heater comprises a heater tube 12 which may be of metal or other suitable material, and in which the pre-heating of the nitrogen actually is conducted. Surrounding this heater tube is a heating jacket furnace 14. Suitable sources of heat, such as gas burners and the like, are provided within the furnace 14. The calcination reactor also comprises a metal tube 22 disposed in a furnace 24 which may be a gas fired furnace.

In the practice of the process, nitrogen is introduced at a rapid rate into the lower portion of the tube 12 and flows upwardly through line 30 and into the lower portion of tube 12. This nitrogen flows upwardly through a fluidized bed of carbon granules or like relatively coarse inert materials (not shown) which are disposed in tube 12. Additional carbon granules are added as needed from a charging device 32 through line 34. The fluidized bed is heated to an elevated temperature, usually above 500° C. and frequently as high as 1500° C., by gas burners disposed in the gas furnace 14 and thereby converts oxygen and carbon dioxide in the nitrogen to carbon monoxide. The heated nitrogen escapes from the top of the pre-heater through line 36 and is discharged into a cyclone separator 38 to separate dust. This dust is collected in the bottom of the separator and may be removed from time to time through the bottom outlet 40.

The nitrogen is removed from the cyclone separator through line 50 and is led to the bottom of tube 22 which tapers to a conical inlet. Barium carbonate granules are fed from a supply bin 52 into a hopper 54 and thence through a rotating star valve 56 into line 58. This line discharges into line 50 and, thus, the hot nitrogen entering the tube 22 picks up the barium carbonate pellets and carries them into the tube 22. A fluidized bed of barium oxide or a mixture of barium carbonate and barium oxide is maintained in tube 22, the upper level of this fluid bed being at the level of the overflow pipe 60. This overflow pipe discharges the calcined product. In order to permit the nitrogen to by-pass the preheater and/or the pellet feeding line, by-pass lines 62, 64, and 66 are provided. Effluent gases from the reaction escape above the fluid bed through the top of the tube, as indicated in the drawing.

The practice of this process is especially advantageous since it tends to avoid fusion of the barium carbonate during calcination. Preferably, the fluidized bed is so operated that it is largely barium oxide. It will be understood that inasmuch as the bed itself is turbulent, its composition is substantially uniform, particularly in the upper portions thereof. As a consequence of the calcination, the fluid bed will contain substantial portions of barium oxide and barium carbonate together with some barium peroxide. There is also present a concentration of carbon, depending upon the amount of carbon incorporated in the barium carbonate product introduced into the bed.

In calcining barium carbonate according to this method, the fluid bed may be operated in a manner such as to achieve any degree of calcination from ten to one hundred percent. On the other hand, best results are obtained when the barium oxide content of the bed is in excess of 50 percent of the BaO content of the barium carbonate going into the fluidized bed. This method affords a convenient method of avoiding the difficulties encountered in conventional calcining processes which appear to be due to a formation of a barium oxide-barium carbonate eutectic. Thus, there is a definite indication that such eutectic melts at a much lower temperature than do either barium oxide or barium carbonate and, consequently, the eutectic which may be formed during calcination tends to promote fusion of the product. In contrast, the present process affords a convenient method wherein the barium carbonate is added to a calcining bed which contains a large amount of barium oxide. Thus, the composition of the bed, with respect to barium oxide and barium carbonate, is above that at which the barium oxide-barium carbonate eutectic has been regarded to exist. Because the overall composition of the bed is such that the barium oxide content thereof is above that at which the low melting barium oxide-barium carbonate eutectic is formed, fusion is minimized. For this reason, it is found advantageous to conduct the calcination under conditions such that the bed contains at least 50 to 75 percent, and preferably in excess of 90 percent, of BaO based upon the total amount of BaO and barium carbonate in the fluidized bed.

It will be understood, of course, that the process may be conducted in a plurality of stages. Thus, two or more fluidized beds of barium oxide and barium carbonate may be provided in order to effect a partial calcination in one bed and a further calcination in another bed. However, even in such cases it is found most advantageous to conduct the operation so that the major portion of the BaO (more than ½) in the fluidized bed is present in the bed as barium oxide. In optimum operation, the beds may contain 90 to 98 percent of barium oxide, based upon the total BaO in the bed. While beds of higher barium oxide content may be operated, this is usually impractical.

The following is an illustrative example of this embodiment of the invention:

*Example 1*

The apparatus illustrated in Fig. 1 was used. In this test, the calcination reactor comprised a metal tube 22 having a diameter of 4 inches at the top of the bed level and a diameter of 3 inches at the end of the tube where it was tapered to provide the inlet for the reactants. The distance between the end of the tube and the top of the bed was 56 inches. The nitrogen pre-heater constituted a 4 inch diameter tube 12 which was 36 inches long.

In a typical operation, 100 parts by weight of finely divided barium carbonate having a particle size of minus 100 to plus 300 mesh, 7 parts by weight of carbon lampblack, and one part by weight of an aqueous paste of wheat starch, were mixed together using an amount of water sufficient to make a stiff plastic mass. The product was extruded through dies approximately 1/16 inch in diameter. The extruded product was baked for about 12 hours at a temperature of about 140° C. The resulting product comprised a plurality of particles approximately 1/16 inch in diameter and ranging from about 1/16 to ¼ inch in length.

These products were then cracked or mildly crushed, and the crushed product was screened to obtain a product ranging from minus 14 to plus 30 mesh in size.

In the calcination, nitrogen was introduced into the bottom of the nitrogen pre-heater and passed through a fluidized bed of graphite granules having a particle size of about minus 14 to plus 80 mesh. The temperature of the nitrogen gas escaping from this bed was approximately 540° C. The temperature of the bed was approximately 850 to 900° C. Consequently, the oxygen and carbon dioxide in the nitrogen were almost quantitatively converted to carbon monoxide. (Note that the nitrogen entering the fluid carbon bed contained 0.4 to 0.8 percent by volume of oxygen and only a minute amount of carbon dioxide.)

The resulting heated nitrogen was fed into the calcination reactor at a rate of 200–265 cubic feet per hour, computed at 760 millimeters pressure and 70° F. About 20 pounds of previously calcined barium carbonate granules, of the type described above and containing in excess of 95 percent BaO, were dumped into the reactor and a fluidized bed was established in the reactor. The temperature of this bed was maintained throughout the run at about 945 to 965° C. During the run, the barium carbonate granules were fed into the nitrogen at a rate of 13 to 14 pounds per hour. The operation was continued over a period of 18 hours and the product withdrawn continuously. This product contained 94 to 99 percent by weight of barium oxide. No scale deposit was apparent on the wall. Only a very small amount of solids fed to the reactor were carried off as solids in the gas stream in the form of dust.

As has been previously explained, it is found preferable to use nitrogen as the fluidizing gas. Air and carbon dioxide are not satisfactory for this purpose since each tends to reverse the reaction and to cause fusion. Carbon monoxide may be used where the temperature of the calcination is above about 1050° C. However, this high temperature sometimes is objectionable because it is difficult to obtain metal which will serve as satisfactory tubes for holding the reaction mixture. Other inert or nonreactive gases may be used, as will be understood by those skilled in the art.

According to a further embodiment of the invention barium carbonate may be calcined in a stream of a gaseous hydrocarbon. The best hydrocarbon for this purpose is methane. However other hydrocarbons which contain up to 4 carbon atoms are such as ethane, propane, butane, propylene, ethylene, butylenes and the like. Such a process may be conducted using methane or like hydrocarbon in lieu of nitrogen or similar nonreactive gas. When such a hydrocarbon is used it has been found that carbon black, commonly incorporated in the particles, may be partially or completely dispensed with. Thus, it has been discovered that, during the reaction, the methane or like hydrocarbon cracks to deposit carbon on the barium carbonate granules. This is highly surprising since it might well be expected that if the methane cracked during the reaction, the carbon might well deposit upon all portions of the reactor rather than upon the barium carbonate. Actually, the carbon which is formed by cracking of the methane is deposited in the pores of the barium carbonate granules and in such intimate contact that the introduction of methane effectively serves the same purpose as the incorporation of carbon in the granules. A further advantage which arises from the use of methane lies in the fact that if oxygen is present in the fluidizing gas, the methane tends to react with it and, thus, the objectionable effect of oxygen can be minimized.

Moreover, even partial decomposition or calcination of barium carbonate is permitted when methane is used. As has been shown above, the carbon tends to reduce fusion, and when no carbon is added to the particles, serious fusion results during calcination. While less than the stoichiometric amount (6 percent of the barium carbonate) may be used, the tendency toward fusion gradually increases and becomes quite serious when only 3 or 4 percent by weight of carbon, based upon the barium carbonate, is used. When methane is used, however, this does not appear to be the case.

Quite probably, the fusion is due to the presence of barium oxide which forms a barium oxide eutectic. On the other hand, the barium oxide is not formed at the relatively low calcination temperatures used in the practice of this process, for example, 800 to 1100° C., unless carbon is present. When methane is used as the primary source of carbon, it follows that the calcination can only occur where the carbon has been deposited by virtue of methane cracking. Since the localized deposition of carbon due to cracking of methane will result in localized calcination of the barium carbonate and since the deposited carbon inhibits fusion where calcination takes place, fusion does not tend to occur. Consequently, a partial decomposition or calcination of barium carbonate readily becomes feasible when methane is used.

Gaseous hydrocarbons other than methane, including ethane, propane, butane, vapors of petroleum naphtha, benzene, and like gases which, upon heating at the elevated temperatures herein contemplated will crack to form carbon, may be used according to the present invention.

The calcination may be effected using both methane, or like hydrocarbon, and elemental carbon. In such a case, a deficiency of carbon (less than 6 percent, for example, 1 to 4 percent by weight) may be incorporated in the granules prior to calcination, and the hydrocarbon used to supply the balance of the carbon.

The following examples are illustrative of the process involving use of methane:

Example II

The apparatus used was that described in Example I except that methane was fed, without pre-heating, into the reactor in lieu of nitrogen. Granules were prepared from a mixture of 1 part by weight of wheat paste and 100 parts by weight of barium carbonate, no carbon being used. These granules were produced by extrusion, drying, crushing, and sizing, as described in Example I. The barium carbonate granules thus obtained were fed to the reactor at a rate of 6.2 pounds per hour. Methane was fed into the reactor in lieu of nitrogen at a rate of 285 cubic feet per hour, measured at a pressure of 760 millimeters and a temperature of 70° F. The temperature of the reaction bed was maintained at approximately 975° C. during the run, and the barium oxide content of the bed remained at 90 to 92 percent by weight of the bed. The calcination was carried out for a period of 5 hours, and the product withdrawn contained 90 to 92 percent of barium oxide. The bed did not fuse or stick during the run.

Example III

Using the apparatus described in Example I, a fluidized bed of baked barium carbonate granules having a particle size such that 100 percent passed through 14 mesh and remained on 30 mesh was established. These granules were prepared as described in Example I except that 4 parts by weight of carbon and 1 part by weight of wheat starch were used per 100 parts by weight of barium carbonate. These granules were fed to the reactor at a rate of 14.4 pounds per hour, according to the process of Example I. Nitrogen pre-heated to a temperature of approximately 550° C., flowing at a rate of 200 to 285 cubic feet per hour, and measured at 760, was mixed with a stream of cold methane flowing at a rate of 56 cubic feet per hour. These gas flows were measured in terms of the flow at 70° F. and 760 millimeters pressure. The resulting gas mixture was fed into the bottom of the reactor as in Example I, and was used to maintain the fluidized bed. The operation was continued over a period of 7 hours and the resulting product was continually withdrawn during the run. This product contained 92 to 97 percent BaO. There was no detectable scaling of the reactor wall or fusion of the reaction mixture.

Example IV

The procedure in this experiment was substantially that described in Example I, and the equipment was the same. The feed was a mixture of 7 parts by weight of carbon, 1 part by weight of wheat paste, and 100 parts by weight of barium carbonate, the particles which were greater in size than 14 mesh, or less than 30 mesh, being screened out. The feed of these granules was 10.4 pounds per hour. The nitrogen was heated in the pre-heater at a temperature of about 500° C. and fed into the reactor at a rate of 225 cubic feet per hour. Prior to introducing the nitrogen into the reactor, it was mixed with cold methane introduced at a rate of 50 cubic feet per hour. These gas flows are expressed in terms of their volume at 760 millimeters pressure at 70° F. This mixture was fed into the bottom of the reactor and used to establish the fluidized bed. The temperature of the reaction bed was maintained at 950° C. throughout the run. The run was continued for a period of 3¾ hours at these conditions, and the product which was withdrawn continually during the run contained 93 to 95 percent BaO. No scale or deposit was apparent on the tube wall, and no accumulation of scale or fused product developed within the reactor.

The barium carbonate used in the runs was substantially all barium carbonate containing small amounts, usually not in excess of about 1 or 2 percent of barium hydroxide and, in some cases, a small amount of sulfur, usually not in excess of about ½ to 1 percent.

While calcination in a fluidized bed is found to be especially effective, other methods of calcination may be resorted to. For example, the granules prepared as described above or even a finely divided mixture of barium oxide, barium carbonate and carbon may be placed on a rotary hearth, or like heating apparatus, and calcined in a stream of inert gas. To avoid or minimize fusion, it is usually desirable to mix the barium carbonate with previously calcined granules. Thus, a portion of the calcined product may be recycled and mixed with barium carbonate entering the furnace, as has been explained above. In such a case, the barium oxide content of the mixture normally will exceed 50 percent of the BaO content of the mixture undergoing calcination. By such means, fusion due to the production of a low melting barium oxide eutectic may be minimized. Radiant heat may be used to heat the hearth in such a process.

Moreover the barium carbonate-carbon mixture may be prepared in other ways. For example, barium carbonate granules such as prepared according to Examples II or III or other barium carbonate compositions which contain little or no carbon or like hydrocarbon may be subjected to a pretreatment with methane at cracking temperatures for example 400–800° C. in order to deposit carbon upon the barium carbonate. Such granule may be calcined in the usual manner for example according to the method shown in Example I.

Barium oxide which is produced by this process may be used for many purposes. It may be reacted with air to produce barium peroxide or with acids to produce various barium salts. It also may be hydrated to produce barium hydroxide.

According to a further embodiment barium oxide granules preheated to a temperature above calcination but below fusion temperatures may be introduced into a fluidized bed such as that described in the Examples I to IV. By this means, additional heat may be introduced into the calcining chamber thus reducing the amount of heat which must pass through the walls of the chamber and permitting use of more refractory and less heat conductive materials of construction. The barium carbonate granules also may be preheated to reaction temperature or somewhat below, for the same purpose.

According to the provisions of the patent statutes, the principle and mode of practicing the invention have been described, together with illustration of what is now considered to represent its best embodiment. However, it is to be understood that, within the scope of the appended claims, the invention may be practiced otherwise than as specifically illustrated and described.

This application contains subject matter also disclosed in the following applications: Rahn Serial No. 279,785, filed April 1, 1952; Rahn et al., Serial No. 279,787, filed April 1, 1952.

What is claimed:

1. A method of calcining barium carbonate which comprises calcining a mixture of barium oxide and barium carbonate while maintaining the barium oxide content of the mixture in excess of 50 percent by weight of the total amount of the mixture substantially throughout the period of calcination.

2. The process of claim 1 wherein the calcination is conducted under reducing conditions in a gas stream and in the presence of reducing carbon and at a temperature of 800 to 1000° C.

3. A method of calcining barium carbonate which comprises establishing a fluidized bed of granules containing barium oxide, said bed containing at least 50 percent by weight of barium oxide, heating the bed to calcination temperature, introducing granules of barium carbonate into the bed and withdrawing granules from the bed while maintaining the barium oxide content of the bed in excess of 50 percent by weight.

4. A method of calcining barium carbonate which comprises establishing a fluidized bed of granules containing barium oxide, and at least 6 percent by weight of carbon, said bed containing at least 50 percent by weight of barium oxide in an upwardly flowing stream of nitrogen, heating the bed to calcination temperature, introducing granules of barium carbonate into the bed and withdrawing granules from the bed while maintaining the barium oxide content of the bed in excess of 50 percent by weight.

5. A method of calcining barium carbonate which comprises calcining a mixture of barium oxide and barium carbonate while maintaining the barium oxide content of the mixture in excess of 90 percent by weight of the total amount of the mixture substantially throughout the period of calcination.

6. A method of calcining barium carbonate which comprises establishing a fluidized bed of granules containing barium oxide, and at least 6 percent by weight of carbon, said bed containing at least 90 percent by weight of barium oxide in an upwardly flowing stream of nitrogen, heating the bed to calcination temperature, introducing granules of barium carbonate into the bed and withdrawing granules from the bed while maintaining the barium oxide content of the bed in excess of 90 percent by weight.

7. A method of calcining barium carbonate which comprises establishing a fluidized bed of granules containing barium oxide, and at least 6 percent by weight of carbon, said bed containing at least 50 percent by weight of barium oxide in an upwardly flowing stream of methane, heating the bed to calcination temperature, introducing granules of barium carbonate into the bed and withdrawing granules from the bed while maintaining the barium oxide content of the bed in excess of 50 percent by weight.

8. A method of calcining barium carbonate which comprises establishing a fluidized bed of granules containing barium oxide, and at least 6 percent by weight of carbon, said bed containing at least 50 percent by weight of barium oxide in an upwardly flowing stream of carbon monoxide, heating the bed to calcination temperature, introducing granules of barium carbonate into the bed and withdrawing granules from the bed while maintaining the barium oxide content of the bed in excess of 50 percent by weight.

9. A method of calcining barium carbonate which comprises establishing a fluidized bed of barium oxide, heating the bed to calcination temperature, introducing barium carbonate into the bed, and withdrawing calcined barium oxide from the bed while maintaining the barium oxide of the bed in excess of 50 percent by weight based upon the total weight of BaO and barium carbonate in the fluidized bed.

References Cited in the file of this patent

UNITED STATES PATENTS

| 779,210 | Egly | Jan. 3, 1905 |
| 1,067,595 | Ekstrom | July 15, 1913 |
| 1,243,190 | Kremers | Oct. 16, 1917 |
| 2,465,410 | White | Mar. 29, 1949 |

FOREIGN PATENTS

| 5,280 | Great Britain | 1885 |

OTHER REFERENCES

Kalbach: "Improving Solids, Gas Contacting by Fluidization," June 1944, Chem. and Metallurgical Eng., pages 94–98.

Kalbach: "Fluidization in Chem. Reactions," pages 105, 108 in Chem. Eng. Jan. 1947.

Gordon Kidoo: "Flow in Fluidized Reaction Systems," pages 112, 114 in Chem. Eng., May 1949.

Leplay et al.: Le Moniteur Scientifique, vol. 27, pages 1194–1198 (1885.)